United States Patent Office 3,734,911
Patented May 22, 1973

3,734,911
DIALKYL-XANTHINE DERIVATIVES
Walter Bestian, Braunschweiger Strasse 5,
Bad Gandersheim, Germany
No Drawing. Filed Mar. 23, 1970, Ser. No. 22,075
Claims priority, application Germany, Mar. 28, 1969,
P 19 15 979.6–44
Int. Cl. C07d 57/48
U.S. Cl. 260—256                                                33 Claims

ABSTRACT OF THE DISCLOSURE

Dialkyl-xanthine derivatives including the pharmaceutically acceptable salts and quaternary ammonium salts characterized by their coronary dilating and central inhibiting activity and have the formula:

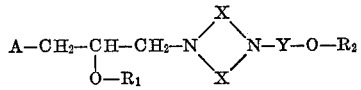

wherein A designates a 1,3-dimethyl-xanthine or a 3,7-dimethyl-xanthine radical, $R_1$ and $R_2$ each designate hydrogen, an aliphatic, cycloaliphatic, heterocyclic or aromatic acyl radical, X designates alkylene having 2 to 3 carbon atoms and Y designates alkylene having 2 to 4 carbon atoms.

---

This invention relates to a novel series of therapeutically valuable dialkyl-xanthine derivates and to a process of preparing and using the same. More particularly, this invention relates to dialkyl-xanthine derivates characterized by coronary dilating and central inhibiting activity.

The new dialkyl-xanthine derivates and their pharmaceutically acceptable salts and quaternary ammonium salts are characterized by the following formula for the free base:

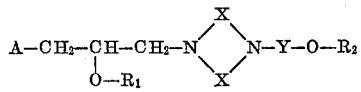

wherein A designates a 1,3-dimethyl-xanthine or a 3,7-dimethyl-xanthine radical, $R_1$ and $R_2$ each designate hydrogen, an aliphatic, cycloaliphatic, heterocyclic or aromatic acyl radical, X designates alkylene having 2 to 3 carbon atoms and Y designates alkylene having 2 to 4 carbon atoms.

The new dialkyl-xanthine derivates corresponding to the above formula can be advantageously prepared by any of the following procedures:

(a) reacting 1,3-dimethyl-xanthine or 3,7-dimethyl-xanthine with a compound having the formula:

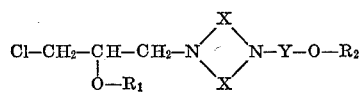

wherein $R_1$, $R_2$, X and Y have the same significance as given above, in the presence of an acid binding agent and if desired thereafter acylating the hydroxyl group;

(b) reacting a compound of the formula:

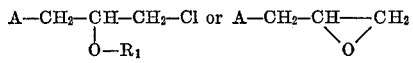

with a one-sided substituted 1,4-diaza-cycloalkane having the formula:

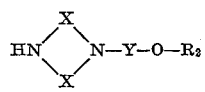

wherein A, $R_1$, $R_2$, X and Y have the same significance as set out above, if required in the presence of an acid binding agent;

(c) reacting a compound having the formula:

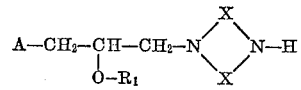

with an alkylene oxide, or in the presence of an acid binding agent with a compound of the formula:

$$Cl-Y-O-R_2$$

wherein A, $R_1$, $R_2$, X and Y have the same significance as given above and preferably thereafter acylating the hydroxyl group by the conventional method:

(d) acylating in the conventional manner, a compound having the formula:

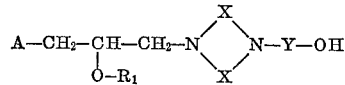

wherein A, $R_1$, $R_2$, X and Y have the same meanings as set out above and preferably thereafter converting the acylated compound into its corresponding salt.

The process is accordance with the invention as described above at (a) utilizes disubstituted diaza-cycloalkane compounds which are relatively easily obtained from diazacycloalkane compounds substituted on one side by an alkanol group, or from the acrylated derivatives thereof by conversion with epihalogen-hydrines.

The process as set out under (b) utilizes for the condensation with the substituted diaza-cycloalkanes, xanthine derivatives, which in the case where $R_1$ is hydrogen are known. The acylated derivatives however are new. These are obtained in very good yields by the known acylation methods from the corresponding chlorohydrines, most advantageously in the presence of an acid binding agent, for instance, through conversion with acid chlorides in an inert solvent, at temperatures between 120 and 150° C. From the thusly obtained acylation products, there have been prepared for example: 7-(α-chloro-β-benzoyloxy)-propyl-1,3-dimethyl - xanthine having a melting point of 142–143° C., 7-(α-chloro-β-diphenyl-acetoxy)-propyl-1,3-dimethyl-xanthine having a melting point of 122–123° C., 7-(α-chloro-β-(2-phenyl-butyryl-oxy))-propyl-1,3-dimethyl-xanthine having a melting point of 108–109° C., 7-(α-chloro-β-pyridine (3)-carbonyloxy)-propyl-1,3-dimethyl-xanthine having a melting point of 133–134° C., and 7-(α-chloro-β-(3,4,5-trimethoxy-benzoyloxy))-propyl-1,3-dimethyl - xanthine having a melting point of 186° C.

The process as described at (c) uses as starting material, dialkyl-xanthine-diaza-cycloalkane compounds which are in part new. These can be obtained from the corresponding dialkyl-xanthine-chlorohydrines or the acylation products thereof, in good yields, by conversion with diaza-cycloalkane-hydrohalides. If necessary, in the preparation of these compounds, there can also be utilized diaza-cycloalkanes which carry on one side thereof a protected N-atom and after the reaction, splitting off the protective group from the reaction product hydrolytically.

The new dialkyl-xanthine derivates are practically insoluable in water as far as acylation products are concerned. They are, however, apt to form stable salts with mineralic acids and organic acids which have good solubility in water. Regarding pharmaceutical application, e.g. the hydrochlorides, the phosphates, the lactates, the orotates, the gluconates etc. may be mentioned. By reaction of the free basic esters with alkyls of iodine, of bromine and of sulfates the quarternary ammonium salts can be manufactured, which also have a good solubility in water.

The compounds in accordance with the invention constitute valuable pharmacological agents having multiple types of activities and in particular coronary vessel dilating activity and simultaneously therewith central inhibiting properties.

With low doses, there are observed in the isolated heart using the method of Langendorff an intensive coronary vessel dilating effect and also in the live dog a long-lasting coronary blood flow increase. This increase in coronary blood flow amounts to, for example, using the compound of Example 6 (infra) at a dose of 1 mg./kg., as compared to the control or base value to 257%. After 100 minutes the coronary blood flow increase was still elevated by 147%. However, the heart frequency, EKG and blood pressure remained unchanged although the heart beat volume was increased two-fold.

The compound of Example 13 (infra) when employed in the Langendorff heart produced a clear, positive inotropic activity and following the administration of 1, 5 and 50 µg./heart of the compound a coronary dilation of 150, 200 and 250% respectively.

The compounds of the invention exhibit only relatively little toxicity. Thus, for instance, the $LD_{50}$ determined for the compounds of Examples 6 and 13 following i.v., administration amounted to 400 mg./kg. and 370 mg./kg. respectively and following oral administration the $LD_{50}$ was in excess of 2000 mg./kg.

The spasmolytic activity against histamine, acetylcholine and barium chloride is very marked. The $ED_{50}$ against barium chloride as spasmogen determined for the compound of Example 1 (infra) amounted to $1 \cdot 10^{-8}$ and for the compound of Example 6 to $5 \cdot 10^{-8}$. These latter compounds were determined to be 100 fold and 50 fold respectively more effective in this regard than the standard spasmolytic agent papaverin.

Additionally, the compounds of the invention, when administered even in low doses exhibit an intensive central inhibition activity. This property together with the coronary specific activity makes the compounds outstandingly suitable as coronary therapeutica having inhibiting properties.

The compounds and especially the soluble salts of these new compounds are applied in the treatment of heart diseases (angina pectoris vasomotorica, insufficient coronary blood supply, coronary insufficiency in addition to myocarditis, coronary thrombosis and dysregulation of the neuro-vegetative system) perorally by form of watery liquids, tablets, dragees or capsules and parenterally by form of injectibles or infusion liquids. The usual doses variate from 10 to 50 mg. pro die as to the injectibles and from 150 to 500 mg. for peroral use.

Various dialkyl-xanthine derivatives and their acetylation and benzoylation products have been made known through German Pat. No. 1,140,190 and the Zeitschrift Circulation Journal, vol. 26 (1962), p. 407-418. The compounds of the invention differ structurally from these known compounds by the fact that the known compounds are dialkylamino alkanol group substituted dialkyl xanthines, while the compounds of the invention have bifunctional substituents and in that they are possessed of an intensity and range of activity far exceeding that possessed by the known compounds.

In comparison experiments carried out with the compounds of the invention and those described in the Zeitschrift, pharmacological data was obtained which established that the compounds of the invention had an intensive coronary activity and a 10 to 50 fold higher spasmolytic activity than did the known compounds. Further in contrast to the marked inhibiting effect exhibited by the compounds of the invention, the known compounds had no such effect.

The following examples are given in order to illustrate the invention and are in no wise to be construed as limiting its scope.

EXAMPLE 1

A mixture of 18.3 parts by weight of 7[3-N($N^1$-β-hydroxy-ethyl)-iperazino-2-hydroxy]-propyl-1,3 - dimethylxanthine having a melting point of 148–150° C., 11.5 parts by weight benzoic acid chloride, 14 parts by volume triethylamine and 60 parts by volume toluene, was slowly warmed up under stirring to the boiling temperature of the mixture. After 5 hours of heating, 10 parts by weight of sodium bicarbonate were added to the reaction mixture and the latter then heated under reflux for a further 2 hours. The sodium chloride which then separated out was separated off with suction and the reddish toluene solution allowed to crystallize under strong cooling. There was obtained 7[3 - N($N^1$-β-benzoyl-oxy-ethyl)-piperazino-2-benzoyloxy]-propyl-1,3-dimethyl-xanthine in crystalline form in a very good yield. The final product was a solid, colorless powder having a melting point of 136–138° C. The corresponding dihydrochloride was crystallized from aqueous 90% ethanol in the form of colorless needles melting at 238–240° C.

EXAMPLE 2

A mixture of 37.6 parts by weight 7(α-chloro-β-benzoyloxy)-propyl-1,3-dimethyl-xanthine having a melting point of 142–143° C., 13 parts by weight N-(β-hydroxyethyl)-piperazine, 9 parts by weight sodium bicarbonate and 50 parts by volume xylene was heated under reflux for 4 hours. The thusly formed 7[3-N($N^1$-β-hydroxyethyl)-piperazino-2-benzoyloxy]-propyl - 1,3 - dimethylxanthine separated out in the cold as a strongly viscous red oil.

Without isolating the reaction product, 14 parts by weight benzoic acid chloride, and 10 parts by weight triethylamine were introduced into the mixture and it was heated to boiling for 3 hours. The reaction product thereby obtained was washed with water, the organic layer separated off, dried and evaporated. The strongly viscous, oily residue was crystallized out of toluene. The product obtained was identical to that of Example 1, had a melting point of 136–137° C. and was recovered in very good yield.

EXAMPLE 3

A mixture of 36.6 parts by weight 7[3-N($N^1$-β-hydroxy-ethyl)-piperazine-2-hydroxy]-propyl-1,3 - dimethylxanthine, 36.5 parts by weight 2-phenyl-butyric acid chloride (boiling point 15$^{108–111° C.}$), 20 parts by weight triethylamine and 250 parts by volume toluene, under stirring was slowly heated up to boiling and then heated under reflux for 6 hours. After cooling, the reaction product was vigorously stirred together with 150 parts by volume of a 5% potash solution, thereafter the toluene solution was separated off, dried and evaporated. The viscous residue was dissolved in ethanol. On the addition of ethanolic hydrochloric acid, 7[3-N($N^1$-β-2-phenylbutyryl - oxy - ethyl)-piperazine-2-(α-phenyl-butyryloxy]-propyl-1,3-dimethyl-xanthine dihydrochloride separated out. Following crystallization out of methanol, there was recovered a colorless powder melting at 230–231° C.

EXAMPLE 4

14.6 parts by weight 7[3-N($N^1$-β-hydroxy-ethyl)-piperazino-2-hydroxy-propyl-1,3-dimethyl-xanthine in 80 parts by volume toluene and 0.5 part by weight of sodium amide were heated together for 1 hour under reflux. Following the addition of 14.3 parts by weight 2-phenyl-butyric acid methylester, the resulting mixture was heated at 130–140° C. for 5 hours. The methanol which was formed was closely distilled off. On cooling, the reaction product was washed with water and the organic solution then further worked up as set out in Example 3. There was recovered in good yield 7[3-N($N^1$-β-2-phenyl-butyryloxy-ethyl)-piperazino-2-(2-phenyl-butyryloxy)]-propyl- 1,3-dimethyl-xanthine - dihydrochloride having a melting point of 230–232° C.

EXAMPLE 5

18.3 parts by weight 7[3 - N-N(N$^1$-β-hydroxy-ethyl)-piperazino-2-hydroxy]-propyl-1,3-dimethyl-xanthine, 24.5 parts by weight 3,4,5-trimethoxy-benzoic acid chloride, 14 parts by volume triethylamine and 100 parts by volume xylene were heated together under reflux for 6 hours. After the addition of 20 parts by weight sodium bicarbonate the mixture was heated for 2 hours at its boiling point. The cooled mixture was washed with water and the organic solution dried. On evaporation, there were obtained 36 parts by weight of a strongly viscous syrup which on treatment with methanol or methyl-isobuyl-ketone resulted in a colorless 7[3-N(N$^1$-β-3,4,5-trimethoxy)-piperazino-2-(3,4,5-trimethoxy - benzoyloxy)]-propyl - 1,3 - dimethyl-xanthine having a melting point of 126–128° C.

EXAMPLE 6

7.2 parts by weight 7[α - chloro-β-(3,4,5-trimethoxy-benzoyloxy)]-propyl-1,3-dimethyl-xanthine having a melting point of 186–187° C., 2 parts by weight N(2-hydroxy-ethyl)-piperazine, 2 parts by weight sodium bicarbonate and 25 parts by volume xylene were heated together for 6 hours under reflux. Thereafter, the formed basic compound was extracted from the xylene solution with excess lactic acid, the extract made alkaline with soda lye and the piperazine derivative which separated out taken up in benzene. Following evaporation, there were recovered 7 parts by weight of 7[3 - N(N$^1$ - β-hydroxy-ethyl)-piperazino-2-(3,4,5-trimethoxy-benzoyloxyl)] - propyl - 1,3-dimethyl-xanthine as a syrup. The syrup was dissolved in methanol and on the addition of concentrated hydrochloric acid, the dihydrochloride having a melting point of 226–228° C. was formed.

5 parts by weight of the latter free ester was dissolved in 25 parts by volume toluene and after the addition of 2.3 parts by weight 3,4,5-trimethoxy-benzoic acid chloride and 2 parts by weight sodium bicarbonate, the mixture was heated for 5 hours under reflux. The resulting mixture was further worked up and isolated as described in Example 5. There were thusly obtained 6.5 parts by weight 7[3-N(N$^1$-β-3,4,5-trimethoxy - benzoyloxy - ethyl)-piperazino-2-(3,4,5 - trimethoxy - benzoyloxy)]-propyl-1,3-dimethylxanthine. The hydrochloride crystallized out of methanol melted at 225–227° C.

EXAMPLE 7

65 parts by weight N[2(3,4,5-trimethoxy-benzoyloxy)-ethyl]-piperazine, 54 parts by weight 7(α-chloro-β-hydroxy)propyl-1,3-dimethyl-xanthine, 200 parts by volume isopropanol and 20 parts by volume sodium bicarbonate were heated together in a water bath under reflux for 4 hours. The salt which separated out was removed with suction and the alcoholic solution under strong cooling allowed to crystallize out. There were thusly recovered in very good yield, as a colorless powder having a melting point of 144–147° C., 7[3-N(N$^1$-β-3,4,5-trimethoxy-benzoyloxy - ethyl) - piperazino - 2 - hydroxy]propyl-1,3-dimethyl-xanthine.

EXAMPLE 8

A mixture of 19.8 parts by weight 7-(3-N-piperazino-2-hydroxy)-propyl-1,3-dimethyl-xanthine dihydrochloride having a melting point of 232–234° C., 13.8 parts by weight 3,4,5-trimethoxy-benzoic acid - β - chloroethylester having a melting point of 71–72° C., 17 parts by weight sodium bicarbonate and 70 parts by volume methylisobutylketone was refluxed for 7 hours. Thereafter 7 parts by volume triethylamine and 12 parts by weight 3,4,5-trimethoxybenzoic acid chloride were introduced into the resulting mixture. After boiling for an additional 5 hours, water was introduced, the organic layer separated off, dried and evaporated. There were recovered 37 parts by weight of a reddish-brown syrup. The syrup was taken up in methanol whereby 7[3-N(N$^1$-β-3,4,5-trimethoxy-benzoyloxy-ethyl) - piperazino-(3,4,5 - trimethoxy - benzoyloxy)]-propyl-1,3-dimethyl-xanthine crystallized out as a colorless powder having a melting point of 125–127° C.

EXAMPLE 9

A mixture of 18.3 parts by weight 7[3-N(N$^1$-β-hydroxy-ethyl)-piperazino - 2 - hydroxy]-propyl - 1,3 - dimethyl-xanthine, 23 parts by weight diphenyl-acetic acid chloride and 80 parts by volume toluene was stirred and reacted with 14 parts by volume triethylamine. During the reaction, the temperature increased to about 45° C. The mixture was then heated under reflux for 5 hours, the reaction mixture cooled and washed with water and potash solution. Following drying and evaporation of the toluene solution, there were recovered 38 parts by weight of a reddish-brown oil, which on treatment with isopropanol crystallized out colorless needles having a melting point of 142–143° C. The dihydrochloride of 7[3-N(N$^1$-β-diphenylacetoxy - ethyl) - piperazino-2-di-phenylacetoxy]-propyl - 1,3 - dimethyl-xanthine was crystallized out of isopropanol and had a melting point of 233–234° C.

EXAMPLE 10

Analogously to Example 9, 18.3 parts by weight 1[3-N(N$^1$-β-hydroxy-ethyl)-piperazino - 2 - hydroxy]-propyl-3,7-dimethyl-xanthine having a melting point of 166–167° C., 23 parts by weight diphenyl-acetic acid chloride and 14 parts by weight triethyl-amine in xylene were reacted to produce 38 parts by weight 1[3-N(N$^1$-β-diphenylacetoxy-ethyl)-piperazino - 2 - diphenylacetoxy]-propyl-3,7-dimethyl-xanthine-dihydrochloride having a melting point of 210–212° C.

EXAMPLE 11

Following the procedure of Example 9, 36.6 parts by weight 7[3-N(N$^1$-β-hydroxy - ethyl) - piperazino - 2 - hydroxy]-propyl-1,3-dimethyl-xanthine, 34 parts by weight phenylacetylchloride and 28 parts by volume triethylamine were reacted to form in an about 90% yield, 7[3-N(N$^1$-β-phenylacetoxy-ethyl)-piperazino - 2 - phenylacetoxy]-propyl - 1,3 - dimethyl-xanthine. On crystallization from methanol, the recovered compound had a melting point of 115–117° C. The corresponding dihydrochloride crystallized out of methanol had a melting point of 226–228° C.

EXAMPLE 12

36.6 parts by weight 1[3-N(N$^1$-β-hydroxy-ethyl)piperazino - 2 - hydroxy]-propyl - 3,7 - dimethyl-xanthine, 23.2 parts by volume benzoylchloride and 30 parts by volume triethylamine were reacted as set out in Example 9. There was recovered in an over 90% yield, 1[3-N(N$^1$-β-benzoyloxy]-propyl-3,7-dimethyl-xanthine having a melting point of 156–157° C. which was easily crystallized out of alcohol. The orotate, crystallized out of isopropanol had a melting point of 150–154° C. (very strong sintering; no clear melting point).

EXAMPLE 13

Analogously to Example 9, 183 parts by weight 1[3-N(N$^1$-β-hydroxy-ethyl)-piperazino - 2 - hydroxy]-propyl-1,3 - dimethyl - xanthine, 235 parts by weight 3,4,5-trimethoxy benzoic acid chloride, 100 parts by weight triethylamine and 500 parts by volume methyl-isobutyl-ketone, were reacted. After 10 hours of heating under reflux, the triethylamine hydrochloride was suctioned off and the organic solution evaporated. There were obtained about 380 parts by weight of a reddish viscous syrup. On treatment with methanol, there were crystallized out 310–320 parts by weight of 1[3-N(N$^1$-β-3,4,5-trimethoxy-benzoyloxy - ethyl) - piperazino - 2 - (3,4,5-trimethoxybenzoyloxy)]-propyl-3,7-dimethyl-xanthine. The product was a colorless body having a high bulk weight and a melting point of 118–120° C. On recrystallizing from methanol, the melting point remained unchanged. The dihydrochloride crystallized out of methanol was recovered in colorless form and had a melting point of 203–206° C. (decomposition). The corresponding gluconate had excellent water-soluble properties at neutral reaction.

EXAMPLE 14

Following the procedure of Example 13, 13.2 parts by weight 7[3 - N(N$^1$ - β - hydroxy-propyl)-piperazino-2 hydroxy]-propyl - 1,3 - dimethyl-xanthine having a melting point of 135–137° C., and 10 parts by weight benzoic acid chloride in 9 parts by volume triethylamine were reacted to form 7[3-N(N$^1$-β-benzoyloxy-propyl)-piperazino-2-benzoyloxy]propyl - 1,3 - dimethyl-xanthine which was crystallized out of alcohol in colorless form, having a melting point of 151–153° C. The dihydrochloride was crystallized out of ethanol or methanol having a melting point of 246–248° C.

EXAMPLE 15

Analogously to Example 13, 1[3-N(N$^1$-β-benzoyloxy-propyl) - piperazino - 2 - benzoyl - oxy]-propyl-3,7-dimethyl-xanthine was prepared from 1[3-N(N-β-hydroxy-propyl) - piperazino - 2 - hydroxy]propyl - 3,7 - dimethyl-xanthine (M.P. 151–152° C.) and 2 mol benzoyl-chloride. The dihydrochloride was easily crystallized out of methanol and had a melting point of 243–245° C.

EXAMPLE 16

9.5 parts by weight 7[3-N(N$^1$-β-hydroxy-propyl)piperazino-2-hydroxy]-propyl - 1,3 - dimethyl-xanthine (M.P. 135–137° C.), 12.65 parts by weight 3,4,5-trimethoxy-benzoic acid chloride, 7 parts by volume triethylamine and 50 parts by volume toluene were brought to reaction by 7 hours of heating. The reaction mixture was worked up and there were recovered 19 parts by weight of a red syrup. The syrup was taken up in methanol whereupon 7[3-N(N$^1$ - β-3,4,5 - trimethoxy-benzyloxy-propyl)-piperazino - 2 - (3,4,5 - trimethoxy-benzyloxy)]-propyl-1,3-dimethyl-xanthine having a melting point of 88–90° C. was crystallized out. By addition of methanolic hydrochloric acid to an alcoholic solution of the ester, 18 parts by weight of the dihydrochloride were obtained.

EXAMPLE 17

9.15 parts by weight 7[3-N(N$^1$-β-hydroxy-ethyl]-piperazino - 2 - hydroxy]-propyl-1,3-dimethyl-xanthine and 15 parts by weight 3,4,5-triethoxy-benzoic acid chloride in the presence of 5.5 parts by weight triethylamine and 50 parts by volume toluene were heated together under reflux for 5 hours. There were recovered 21 parts by weight 7[3-N(N$^1$ - β - 3,4,5 - triethoxy-benzoyloxy-ethyl)-piperazino - 2 - (3,4,5-trimethoxy-benzoyloxy)-propyl-1,3-dimethyl-xanthine. The ester was insoluble in water. It crystallized out of methanol or isopropanol to provide a product having a melting point of 107–108° C.

EXAMPLE 18

9.15 parts by weight 7[3-N(N$^1$-β-hydroxy-ethyl)-piperazino - 2 - hydroxy]-propyl-1,3-dimethyl-xanthine and 10 parts by weight 1-naphthoic acid chloride in the presence of 7 parts by volume triethylamine and 50 parts by volume toluene were refluxed for 8 hours. Following washing with potash solution and water and removal of the toluene, 17 parts by weight 7[3-N(N$^1$-β-1-naphthoyloxy-ethyl)-piperazino-2-naphthoyloxy]-propyl - 1,3 - dimethyl-xanthine were recovered. This compound after being twice crystallized out of methanol had a melting point of 127–129° C.

EXAMPLE 19

18.3 parts by weight 7[3-N(N$^1$-β-hydroxy-ethyl)-piperazino-2-hydroxy]-propyl-1,3-dimethyl-xanthine, 18.7 parts by weight 4-methoxy-benzoic acid chloride, 14 parts by volume triethylamine and 75 parts by volume toluene were reacted together by heating for 7 hours. Following, washing, drying and evaporation of the toluene solution, 32 parts by weight 7[3-N(N$^1$-β-4-methoxy-benzoyloxy-ethyl)-piperazino - 2 - (4-methoxy-benzoyloxy)]-propyl-1,3-dimethyl-xanthine were recovered, which could be crystallized out of alcohol in the form of needles melting at 137–139° C. By reaction of methyl iodide with the free ester the quaternary ammonium salt is formed. It crystallizes out of acetone, melting at 174–176° C.

EXAMPLE 20

18.3 parts by weight 1[3-N(N$^1$-β-hydroxy-ethyl)-piperazino - 2 - hydroxy]-propyl-1,3-dimethyl-xanthine were reacted analogously to Example 19 with 18.7 parts by weight 4-methoxy-benzoic acid chloride, 14 parts by volume triethylamine and 100 parts by volume of xylene, by heating for 10 hours. There were recovered 31 parts by weight 1[3 - N(N$^1$-β-4-methoxy-benzoyloxy-ethyl)-piperazino - 2 - (4 - methoxy-benzoyl-oxy]-propyl-1,3-dimethyl-xanthine. The free ester was crystallizable only with difficulty and was in part isolated as the dihydrochloride. The dihydrochloride was crystallized out of isopropanol in colorless form and melted with decomposition at 238–240° C.

EXAMPLE 21

9.5 parts by weight 1[3-N(N$^1$-β-hydroxy-propyl)-piperazino - 2 - hydroxy]-propyl-3,7-dimethyl-xanthine (M.P. 151–152° C.), 12.65 parts by weight 3,4,5-trimethoxy-benzoic acid chloride, 7 parts by volume triethylamine and 50 parts by volume toluene were reacted by heating together for 6 hours. Following washing of the reaction product with water and potash solution, the toluene solution was evaporated off. 19.5 parts by weight 1[3-N(N$^1$-β - 3,4,5 - trimethoxy-benzoyloxy-propyl)piperazino - 2-(3,4,5-trimethoxy-benzoyloxy)]-propyl - 3,7 - dimethyl-xanthine were recovered which crystallized very easily from methanol and melted at 143–145° C. On the addition of alcoholic hydrochloric acid to the methanolic solution of the ester, 18 parts by weight of the dihydrochloride were obtained.

EXAMPLE 22

36.6 parts by weight 7[3-N(N$^1$-β-hydroxy-ethyl)-piperazino - 2 - hydroxy]-propyl-1,3-dimethyl-xanthine, 39.1 parts by weight nicotinic acid chloride-hydrochloride, 28 parts by volume triethylamine and 20 parts by volume sodium bicarbonate in methyl-isobutyl-ketone were reacted in 5 hours under heating of the mixture. Following the usual working up, 7[3 - N(N-β-pyridine-(3)-carbonyloxy-ethyl)-piperazino - 2 - pyridine(3)-carbonyloxy]-propyl-1,3-dimethyl-xanthine was recovered in an about 50% yield. The compound was crystallized out of methanol and melted at 153–155° C.

EXAMPLE 23

18.3 parts by weight 7[3-N(N$^1$-β-hydroxy-ethyl)-piperazino - 2 - hydroxy]-propyl-1,3-dimethyl-xanthine, and 20.25 parts by weight 3,4-methylenedioxy-benzoic acid chloride were reacted in the presence of 15 parts by volume triethylamine and 75 parts by volume toluene by heating for 8 hours. Following washing of the reaction product and evaporation of the toluene solution, 31 parts by weight of 7[3-N(N$^1$-β-3,4-methylenedioxy-benzoyloxy-piperazino-2-(3,4 - methylenedioxy-benzoyloxy)]-propyl-1,3-dimethyl-xanthine were recovered. This compound crystallized out of isopropanol as colorless crystals having a melting point of 136–138° C.

EXAMPLE 24

18.3 parts by weight 7[3-N(N$^1$-β-hydroxy-ethyl)-piperazino - 2 - hydroxy]propyl - 1,3 - dimethyl-xanthine, 211 parts by weight 3,4-dimethoxy-benzoic acid chloride, 15 parts by volume triethylamine and 120 parts by volume toluene were heated together for 5 hours and after the addition of 25 parts by weight sodium bicarbonate heated for a further 4 hours. The salt which formed was suctioned off. From the resultant reddish toluene solution, there were crystallized on cooling 34.5 parts by weight 7[3 - N(N$^1$ - β - 3,4 - dimethoxy-benzoyloxy-ethyl)-piperazino - 2 - (3,4 - dimethoxy-benzoyloxy)]-propyl-1,3-dimethyl-xanthine. The ester could be easily crystallized from isopropanol. The crystals had a melting point of 95–97° C. The dihydrochloride crystallized out of aqueous methanol as a colorless powder which melted at 212° (decomposition).

EXAMPLE 25

9.15 parts by weight 1[3-N(N$^1$-β-hydroxy-ethyl)-piperazino - 2 - hydroxy]-propyl-3,7-dimethyl-xanthine, 10.5 parts by weight 3,4-dimethoxy-benzoic acid chloride, 7 parts by volume triethylamine and 125 parts by volume of toluene were heated for 4 hours. Following the addition of 15 parts by weight sodium bicarbonate, the mixture was heated for a further 4 hours. The salt formed was separated with suction. The toluene solution was concentrated to a volume of 70 parts by volume and by the addition of methanolic hydrochloric acid the dihydrochloride (yield about 17.5 parts by weight) of the 1[3-N(N'-β-3,4-dimethoxy-benzoyloxy-ethyl)-piperazino - 2-(3,4 - dimethoxy-benzoyloxy)]-propyl - 3,7 - dimethyl-xanthine was precipitated. The salt crystallized out of methanol melted between 185–188° C. (decomposition).

EXAMPLE 26

18.3 parts by weight 1[3-N(N$^1$-β-hydroxy-ethyl)-piperazino - 2 - hydroxy]-propyl - 1,3 - dimethyl-xanthine, 20.2 parts by weight 3,4-methylenedioxy-benzoic acid chloride, 7 parts by volume triethyl-amine and 100 parts by volume xylene were heated together for 3 hours and following the addition of 10 parts by weight sodium bicarbonate, the heating was continued for a further 4 hours. After 50 parts by volume of acetic ester had been added, the reaction mixture was washed with water, the organic solution dried, and methanolic hydrochloric acid added. The dihydrochloride of 1[3-N(N$^1$-β-3,4-methylene-dioxy-benzoyloxy-ethyl)-piperazino - 2 - (3,4 - methylenedioxy-benzoyloxy)]-propyl-3,7-dimethyl-xanthine seperated out in very good yield. The salt was crystallized out of aqueous methanol as colorless crystals which melted at 230–233° C.

EXAMPLE 27

3.8 parts by weight 7[3-N(N$^1$-β-hydroxy-propyl)-piperazino - 2 - hydroxy]-propyl - 1,3 - dimethyl-xanthine and 3.75 parts by weight 3,4-methylenedioxy-benzoic acid chloride in 20 parts by volume xylene were heated together for 1 hour and after the addition of 2 parts by weight sodium bicarbonate, the mixture was heated for a further 2 hours up to boiling. After the isolation, carried out as described in Example 26, there were recovered 6 parts by weight of the dihydrochloride of 7[3-N(N$^1$-β-3,4-methylenedioxy-benzoyloxy-propyl)-piperazino - 2 - (3,4-methylenedioxy-benzoyloxy)] - propyl - 1,3 - dimethyl-xanthine which could be crystallized out of aqueous methanol. The crystals had a melting point of 242–244° C. (decomposition).

EXAMPLE 28

18.3 parts by weight 1[3-N(N$^1$-β-hydroxy-ethyl)-piperazino - 2 - hydroxy)-propyl - 3,7 - dimethyl-xanthine, 21 parts by weight 3,5-dimethoxy-benzoic acid chloride, 7 parts by volume triethylamine and 100 parts by volume xylene were heated for 3 hours. 15 parts by weight sodium bicarbonate were then added to the mixture and the heating continued for a further 5 hours. After isolation, carried out as described in Example 26, 32 parts by weight 1[3-N(N$^1$-β-3,5-dimethoxy-benzoyloxy-ethyl)-piperazino - 2 - (3,5-dimethoxy-benzoyloxy)]-propyl-3,7-dimethyl-xanthine-dihydrochloride were recovered which easily crystallized out as colorless crystals melting at 195–198° C. (decomposition).

EXAMPLE 29

18.9 parts by weight 7-(α-chloro-β-pyridine(3)-carboxy)-propyl-1,3-dimethyl-xanthine having a melting point of 133–134° C. and 6.5 parts by weight N(2-hydroxy-ethyl)-piperazine were heated under reflux in the presence of 5 parts by weight sodium bicarbonate and 20 parts by volume xylene for 3 hours. 7[3-N(N$^1$-β-hydroxy-ethyl)-piperazino-2-pyridine(3) - carboxy]-propyl - 1,3-dimethyl-xanthine separated out in the cold from the brown syrup formed from the xylene solution.

Without isolation from the reaction mixture, this compound was reacted with 5.8 parts by volume benzoic acid chloride and 7.2 parts by volume triethylamine and the resulting mixture heated for 3 hours. Following washing with dilute potash solution, the xylene solution was concentrated to form a syrup. The syrup was dissolved in methanol and 7[3-N(N$^1$-β-benzoyloxy-ethyl)-piperazino-2-pyridine(3)-carboxy]-propyl-1,3-dimethyl-xanthine converted into the corresponding orotate having a melting point of 148–150° C. by addition of the equivalent amount of orotic acid.

EXAMPLE 30

44.5 parts by weight 3,4,5-trimethoxy-benzoic acid, 16 parts by volume thionyl-chloride and 150 parts by volume xylene were heated together at a temperature of 80° C. until a clear solution had been formed. 36.6 parts by weight 7 - [3 - N(N$^1$-2-hydroxy-propyl)-piperazino-2-hydroxy]-propyl-1,3-dimethyl-xanthine having a melting point of 162–163° C. and 28 parts by volume triethylamine were added and the mixture heated for 5 hours to boiling. The reaction product was washed with water and potash solution, the xylene solution was dried and evaporated. The very viscous residue was crystallized out of methanol. 7[3 - N(N$^1$-β-3,4,5-trimethoxy-benzoyloxy-propyl)-piperazino - 2 - (3,4,5-trimethoxy-benzoyloxy)]-propyl-1,3-dimethyl-xanthine separated out in solid colorless form. The compound had a melting point of 82–85° C. The ester was readily soluble in benzene, toluene, acetic ester and acetonitrile. Following recrystallization from ethanol or isopropanol the melting point remained the same. The dihydrochloride was crystallized out of aqueous methanol. It had a melting point of 187–190° C. (decomposition).

EXAMPLE 31

36.6 parts by weight 1[3-N(N$^1$-β-hydroxy-ethyl)-piperazino - 2 - hydroxy]-propyl-3,7-dimethyl-xanthine, 36.5 parts by volume 2-phenyl-butyric acid chloride, 28 parts by volume triethylamine and 150 parts by volume toluene were reacted together by heating for 6 hours. The reaction mixture was worked up analogously to Example 30 and 1[3-N(N$^1$-β-(2-phenyl-butyryloxy)-ethyl-piperazino-2-(2 - phenyl-butyryloxy)]-propyl-3,7-dimethyl-xanthine-dihydrochloride recovered in good yield. The compound crystallized out in the form of colorless crystals having a melting point of 226–228° C.

EXAMPLE 32

Following the procedure of Example 31, 18 parts by weight 1[3 - N - (N$^1$-β-hydroxy-ethyl)-piperazino-2-hydroxy]-propyl-3,7-dimethyl-xanthine was reacted with 22.5 parts by weight naphthalene-(1)-acetic acid chloride to produce in excellent yield 1[3-N(N$^1$-β-naphthaline(1)-acetoxy-ethyl)-piperazino-2-(naphthaline(1) - acetoxy)]- propyl-3,7-dimethyl-xanthine-dihydrochloride which on crystallization from methanol melted at 233–235° C.

EXAMPLE 33

18.3 parts by weight 1[3-N(N¹-β-hydroxy-ethyl)-piperazino-2 - hydroxy]-propyl - 3,7 - dimethyl-xanthine was reacted with 29 parts by weight 3,4,5-triethoxy-benzoic-acid chloride and there was recovered in very good yield 1[3 - N(N¹ - β-3,4,5-triethoxy-benzoyloxy-ethyl)-piperazino-2-(3,4,5 - triethoxy - benzoyloxy)]-propyl-3,7-dimethyl-xanthine-dihydrochloride which following crystallization from methanol melted at 222–224° C. (decomposition).

EXAMPLE 34

32 parts by weight of 7[3-N(N¹-β-(3-methoxy-benzoyl-oxy-ethyl)-piperazino - 2 - (3-methoxy-benzoyloxy)]-propyl-1,3-dimethyl-xanthine were obtained by reacting 18.3 parts by weight 7[3-N(N¹-β-hydroxy-ethyl)-piperazino-2-hydroxy]-propyl-1,3-dimethyl-xanthine and 18.7 parts by weight 3-methoxybenzoic acid chloride in the presence of 15 parts by volume triethylamine and 75 parts by volume toluene. The hydrochloride crystallized out of methanol in colorless form and had a melting point of 220–222° C. (decomposition).

EXAMPLE 35

18.3 parts by weight 7[3-N(N¹-β-hydroxy-ethyl)-piperazino - 2 - hydroxy]-propyl-1,3-dimethyl-xanthine were reacted as set out in Example 34 with 21 parts by weight 3,5-dimethoxy-benzoic acid chloride to produce 34.5 parts by weight 7[3 - N(N¹ - β - 3,5-dimethoxy-benzoyloxy-ethyl)-piperazino – 2(3,5 - dimethoxy-benzoyloxy)]-propyl-1,3-dimethyl - xanthine dihydrochloride. Following crystallization out of methanol, the compound melted at 222–224° C. (decomposition).

EXAMPLE 36

50.6 parts by weight 3,4,5-trimethoxy-benzoic acid chloride and 30 parts by weight imidazole in 250 parts by volume toluene. After the precipitated imidazole hydrochloride had been separated off, 36 parts by weight 1[3-N(N¹-β-hydroxy - ethyl) - piperazino-2-hydroxy]-propyl-3,7-dimethyl-xanthine were introduced into the solution. The resultant mixture was heated for 6 hours, then washed with water and potash. Following evaporation of the toluene solution, 1[3-N(N¹ - β - 3,4,5 - trimethoxy-benzoyl-oxy-ethyl) - piperazino - 2 - (3,4,5-trimethoxy - benzoyl-oxy)]-propyl-3,7-dimethyl-xanthine was recovered as a yellow-gold syrup in excellent yield. Isolation and crystallisation were carried out as described in Example 13.

EXAMPLE 37

Following heating in alcohol of molar amounts of 1-(2,3 - epoxy - propyl) - 3,7-dimethyl-xanthine and the compounds herein after set out, the designated reaction products were obtained in good yield:

(a) with N-(2-hydroxy-ethyl)piperazine, 1[3-N(N¹-β-hydroxy-ethyl)-piperazino-2-hydroxy]-propyl-3,7-dimethyl-xanthine, melting point 166–167° C.;
(b) with N-(2-hydroxy-propyl)-piperazine, 1[3-N(N¹-β-hydroxy-propyl)-piperazino-2-hydroxy]-propyl-3,7-dimethyl-xanthine, melting point 151–152° C.;
(c) with N-(3-hydroxy-propyl)-piperazine, 1[3-N(N¹-β-hydroxy-propyl)-piperazino-2-hydroxy]-propyl-3,7-dimethyl-xanthine, melting point 163–164° C.

The same compounds in good yield were obtained by condensing oxyalkylated piperazine with epichlorhydrine and then reacted in alcoholic solution, the condensation product with 3,7-dimethyl-xanthine in the presence of a mol of alkali.

EXAMPLE 38

By reacting in an alcoholic medium:
(1) 1(3-N-piperazino-2-hydroxy) - propyl - 3,7-dimethyl-xanthine-(dihydrochloride M.P. 250–252° C.) with ethylene oxide, propylene oxide or 1,3-propylenechlorohydrin, the compounds as set out in Example 37a, b, and c were obtained in good yield.
(2) 1[3 - N - (1,4 - diaza-cycloheptano)-2-hydroxy]-propyl-3,7-dimethyl - xanthine - (dihydrochloride M.P. 244–246° C.) reacted with ethylene oxide to form 1-[3-N(N¹ - β - hydroxy-ethyl)-1,4-diaza-cycloheptano-2-hydroxy)]-propyl-3,7-dimethyl-xanthine having a melting point of 163–166° C.

I claim:
1. A compound of the formula

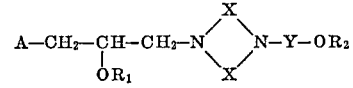

or a pharmaceutically acceptable salt thereof, in which formula
A is 1,3-dimethyl-xanthine or 3,7-dimethyl-xanthine substituted by the remaining moiety of the molecule at the 7-position or 1-position, respectively,
$R_1$ and $R_2$ are the same or different and each is acyl derived from phenylacetic acid, phenylbutyric acid, diphenylacetic acid, naphthoic acid, pyridinecarbonic acid, benzoic acid or benzoic acid substituted by 1–3 alkoxy groups of 1–2 carbon atoms,
X is alkylene having 2–3 carbon atoms and
Y is alkylene having 2–4 carbon atoms.

2. A compound according to claim 1 designated 7[3-N(N¹ - β - benzoyloxy-ethyl)-piperazino-2-benzoyloxy]-propyl-1,3-dimethyl-xanthine.

3. A compound according to claim 1 designated 7[3-N(N¹-β - 2 - phenyl-butyryloxy-ethyl)-piperazino - 2-(2-phenyl-butyryloxy)]-propyl-1,3-dimethyl-xanthine.

4. A compound according to claim 1 designated 7[3-N(N¹-β-3,4,5 - trimethoxy-benzoyloxyethyl)-piperazino - 2 - (3,4,5 - trimethoxy-benzoyloxy)]-propyl-1,3-dimethyl-xanthine.

5. A compound according to claim 1 designated 7[3-N(N¹-β-diphenylacetoxy-ethyl)-piperazino - 2 - diphenylacetoxy]-propyl-1,3-dimethyl-xanthine.

6. A compound according to claim 1 designated 7[3-N(N¹-β-benzoyloxy-propyl)-piperazino-2 - benzoyloxy]-propyl-1,3-dimethyl-xanthine.

7. A compound according to claim 1 designated 7[3-N(N¹-β-benzoyloxy-ethyl)-piperazino - 2 - pyridine(3)-carboxy]-propyl-1,3-dimethyl-xanthine.

8. A compound according to claim 1 designated 7[3-N(N¹-β-phenylacetoxy-ethyl)-piperazino - 2 - phenylacetoxy]-propyl-1,3-dimethyl-xanthine.

9. A compound according to claim 1 designated 7[3-N(N¹-β-1-naphthoyloxy-ethyl)-piperazino - 2 - naphthoyloxy]-propyl-1,3-dimethyl-xanthine.

10. A compound according to claim 1 designated 7[3-N-(N¹-β-3,4,5 - trimethoxy-benzoyloxy-propyl)-piperazino - 2 - (3,4,5 - trimethoxy-benzoyloxy)]-propyl-1,3-dimethyl-xanthine.

11. A compound according to claim 1 designated 7[3-N(N¹-β-3,4,5-triethoxy-benzoyloxy-ethyl)-piperazino - 2-(4 - methoxy-benzoyloxy)]-propyl-1,3-dimethyl-xanthine.

12. A compound according to claim 1 designated 7[3-N(N¹-β - 3,4,5 - trimethoxy-benzoyloxy-propyl)-piperazino - 2 - (3,4,5 - trimethoxy-benzoyloxy)]-propyl-1,3-dimethyl-xanthine.

13. A compound according to claim 1 designated 7[3-N(N¹-β - 3,4 - methylenedioxy-benzoyloxy-ethyl)-piperazino - 2 - (3,4 - methylenedioxy-benzoyloxy)[-propyl-1,3-dimethyl-xanthine.

14. A compound according to claim 1 designated 7[3-N(N¹-β-(3-methoxy-benzoyloxy)-ethyl)-piperazino - 2-(3-methoxy-benzoyloxy)]-propyl-1,3-dimethyl-xanthine.

15. A compound according to claim 1 designated 7[3-N(N¹-β - 3,5 - dimethoxy-benzoyloxy-ethyl)-piperazino-2(3,5 - dimethoxy-benzoyloxy)]-propyl - 1,3-dimethyl-xanthine.

17. A compound according to claim 1 designated 7[3-N(N¹-β-3,4-dimethoxy-benzoyloxy-ethyl)-piperazino - 2-(3,4 - dimethoxy-benzoyloxy)]-propyl - 1,3 - dimethyl-xanthine.

18. A compound according to claim 1 designated 7[3-N(N¹-β - 3,4 - methylenedioxy-benzoyloxy-propyl)-piperazino - 2 - (3,4 - methylenedioxy-benzoyloxy]-propyl-1,3-dimethyl-xanthine.

19. A compound according to claim 1 designated 7[3-N(N¹-β-pyridine(3)carboxy-ethyl)-piperazino - 2 - pyridine(3)-carboxyl]-propyl-1,3-dimethyl-xanthine.

20. A compound according to claim 1 designated 1[3-N(N¹-β-benzoyloxy-ethyl)-piperazino - 2 - benzoyloxy]-propyl-3,7-dimethyl-xanthine.

21. A compound according to claim 1 designated 1[3 - N(N¹ - β - diphenylacetoxy-ethyl)-piperazino - 2-diphenylacetoxy]-propyl-3,7-dimethyl-xanthine.

22. A compound according to claim 1 designated 1[3-N(N¹ - β - 3,4,5 - trimethoxy-benzoyloxy-ethyl) - piperazino - 2 - (3,4,5 - trimethoxy-benzoyloxy)]-propyl-3,7-dimethyl-xanthine.

23. A compound according to claim 1 designated 1[3-N(N¹ - β - benzoyloxy-propyl)-piperazino - 2 - benzoyloxy]-propyl-3,7-dimethyl-xanthine.

24. A compound according to claim 1 designated 1[3-N(N¹ - β - 3,4,5 - trimethoxy-benzoyloxy-propyl)-piperazino - 2 - (3,4,5 - trimethoxy-benzoyloxy)]-propyl-3,7-dimethyl-xanthine.

25. A compound according to claim 1 designated 1[3-N(N¹ - β - 4 - methoxy-benzoyloxy-ethyl)-piperazino-2-(4 - methoxy - benzoyloxy)] - propyl - 1,3 - dimethyl-xanthine.

26. A compound according to claim 1 designated 1[3-N(N¹ - β - 3,4 - dimethoxy - benzoyloxy - ethyl) - piperazino - 2 - (3,4 - dimethoxy - benzoyloxy)] - propyl-3,7-dimethyl-xanthine.

27. A compound according to claim 1 designated 1[3-N(N¹ - β - 3,4 - methylenedioxy-benzoyloxy-ethyl)-piperazino - 2 - (3,4 - methylenedioxy-benzoyloxy)]-propyl-3,7-dimethyl-xanthine.

28. A compound according to claim 1 designated 1[3-N(N¹ - β - 3,5 - dimethoxy-benzoyloxy-ethyl) - piperazino - 2 - (3,5 - dimethoxy-benzoyloxy)]-propyl - 3,7-dimethyl-xanthine.

29. A compound according to claim 1 designated 1[3-N(N¹ - β - (2 - phenyl-butyryloxy-ethyl)-piperazino-2-(2-phenyl-butyryloxy)]-propyl-3,7-dimethyl-xanthine.

30. A compound according to claim 1 designated 7[3-N(N¹ - β - 3,4,5 - trimethoxy-benzoyloxy)-piperazino-2-(3,4,5 - trimethoxy-benzoyloxy)]-propyl - 1,3 - dimethyl-xanthine.

31. A compound according to claim 1 designated 7[3-N(N¹ - β - benzoyloxy-ethyl)-piperazino - 2 - pyridino-(3)-carboxyl]-propyl-1,3-dimethyl-xanthine.

32. A compound according to claim 1 designated 1[3-N(N¹ - β - naphthaline(1) - acetoxy-ethyl)-piperazino-2-naphthaline(1)-acetoxy)]-propyl-3,7-dimethyl-xanthine.

33. A compound according to claim 1 designated 1[3-N(N¹ - β - 3,4,5 - triethoxy-benzoyloxy-ethyl)-piperazino-2 - (3,4,5 - triethoxy-benzoyloxy)]-propyl - 3,7 - dimethyl-xanthine.

References Cited

UNITED STATES PATENTS

| | | | |
|---|---|---|---|
| 2,924,598 | 2/1960 | Bestian | 260—256 |
| 3,399,195 | 8/1968 | Stachel | 260—256 |

FOREIGN PATENTS

| | | | |
|---|---|---|---|
| 1,133,989 | 11/1968 | Great Britain | 260—256 |
| 4,625 | 1/1967 | France | 260—256 |

ALEX MAZEL, Primary Examiner
A. M. T. TIGHE, Assistant Examiner

U.S. Cl. X.R.
260—253; 424—253